UNITED STATES PATENT OFFICE.

HANS MARCUSSEN HÖYBERG, OF FREDERIKSBERG, NEAR COPENHAGEN, DENMARK.

METHOD OF ASCERTAINING THE QUANTITY OF FAT IN MILK AND CREAM.

1,329,183. Specification of Letters Patent. Patented Jan. 27, 1920.

No Drawing. Application filed April 2, 1919. Serial No. 286,997.

*To all whom it may concern:*

Be it known that I, HANS MARCUSSEN HÖYBERG, a subject of the King of Denmark, residing at Frederiksberg, near Copenhagen, Denmark, have invented new and useful Improvements in Methods of Ascertaining the Quantity of Fat in Milk and Cream; and I do hereby declare the following to be a full, clear, and exact description of the same.

For ascertaining the quantity of fat in milk and cream various methods are used. One of the methods most frequently used is Gerber's acid method with subsequent centrifugal separation. Further, Gerber's so-called "sal method" has been used avoiding the employment of concentrated sulfuric acid. Gerber's first sal method consisted in adding a mixture of sodium hydroxid, sodium chlorid and potassium-sodium tartrate, to which was added some red dye, to the milk, and isobutyl alcohol was added in an ordinary butyrometer. The mixture was shaken and left in a water-bath at 45° C., whereafter the mixture was placed in a centrifugal machine during 3 to 5 minutes, and the content of fat was read off from the divisions of the glass at a temperature of 45° C.

This method which, however, has not been much used, was substituted by Gerber's so-called "Neusal method", according to which was used a mixture of alkaline salicylates and alkaline citrates. The carrying out of this method also demands a centrifugal machine.

The present invention aims at avoiding the use of a centrifugal machine for the ascertainment of the quantity of fat in milk. Hereby the necessary apparatus are restricted to the very least possible, and the exceedingly simple and cheap apparatus are easily transportable and can be used in ambulant laboratories for the purpose in question. Ascertainment of the quantity of fat in milk and cream hereby becomes very easy and quickly effected and can be done by any manager of households, milk dealers and any dairy, and the expenses connected with such analyses become quite insignificant.

The method is carried out in the following manner:

9.7 cc. of the well mixed milk is poured into a butyrometer, whereupon is added 3.4 cc. of the liquid indicated below and 0.6 cc. of ordinary technical isobutyl alcohol. Then the butyrometer is closed with a plug and is well shaken during about ¼ minute and turned upside down some few times in order to well mix the liquids. When the shaking is finished the butyrometer is placed in a water-bath at 60-70° C. After 5 minutes the glass is shaken anew for about ¼ minute and is again turned upside down some few times. Then the butyrometer is placed in a water-bath for about 15 minutes, the water reaching about the middle of the uppermost ball shaped part of the butyrometer. The quantity of fat can then be read off directly from the divisions of the glass, and the method gives even very exact results.

For the ascertainment of the quantity of fat in cream the latter is diluted with water in ordinary manner, whereafter the method is carried out in the same manner as described above with the only difference that here is added 0.62 cc. of technical isobutyl alcohol instead of 0.6 cc.

The above named liquid consists of 360 g. potassium sodium tartrate dissolved in one liter of distilled water, to which solution is added a 30% solution of sodium hydroxid in the proportion of ½–1½ volumes of sodium hydroxid solution to 2.2–2.6 volumes of tartrate solution. Thereupon the solution is filtrated and kept in well closed bottles.

It has been proved that in order to obtain a good result it is necessary to follow exactly the above directions, as even a divergence of a few per cent. in the proportions of the substances indicated will give poor results, as the fat will become unclear and will not separate completely from the liquid. In case the above directions are followed exactly, the fat will be separated and gather in an exceedingly clear and well defined layer.

Having thus fully described my invention, I claim as new and desire to secure by Letters Patent.

1. Method of ascertaining the quantity of fat in milk and cream consisting in mixing 9.7 volumes of milk with 3.4 volumes of a solution of potassium sodium tartrate and sodium hydroxid in water and 0.6 volumes of isobutyl alcohol in a butyrometer glass, leaving the mixture for 15–20 minutes in a water-bath at a temperature of 60–70° C. and reading off the quantity of fat directly from the butyrometer glass.

2. Method of ascertaining the quantity of fat in milk and cream consisting in mixing 9.7 volumes of milk with 3.4 volumes of a solution consisting of 360 g. potassium sodium tartrate in one liter of water to which solution has been added a 30% solution of sodium hydroxid in the proportion of $\tfrac{1}{2}$–$1\tfrac{1}{2}$ volumes sodium hydroxid solution to 2.2–2.6 volumes of the solution of potassium sodium tartrate and 0.6 volumes isobutyl alcohol, leaving the mixture for 15–20 minutes in a water-bath at 60–70° C., and reading off the quantity of fat directly from the butyrometer glass.

In testimony whereof I have affixed my signature in presence of two witnesses.

HANS MARCUSSEN HÖYBERG.

Witnesses:
　　VIGGO BLOM,
　　C. V. HÓGSTED.